(12) United States Patent
Tehan et al.

(10) Patent No.: US 11,558,005 B2
(45) Date of Patent: Jan. 17, 2023

(54) PORTABLE SOLAR PHOTOVOLTAIC ARRAY

(71) Applicant: 5B IP HOLDINGS PTY LTD, Alexandria (AU)

(72) Inventors: Eden Tehan, Bensville (AU); Christopher McGrath, Bowral (AU)

(73) Assignee: 5B IP Holdings Pty Ltd, Alexandria (AU)

( * ) Notice: Subject to any disclaimer, the term of this patent is extended or adjusted under 35 U.S.C. 154(b) by 482 days.

(21) Appl. No.: 16/063,075

(22) PCT Filed: Dec. 16, 2016

(86) PCT No.: PCT/AU2016/051253
§ 371 (c)(1),
(2) Date: Jun. 15, 2018

(87) PCT Pub. No.: WO2017/100862
PCT Pub. Date: Jun. 22, 2017

(65) Prior Publication Data
US 2020/0274479 A1    Aug. 27, 2020

(51) Int. Cl.
*H02S 10/40* (2014.01)
*H02S 20/30* (2014.01)
*H02S 30/20* (2014.01)

(52) U.S. Cl.
CPC .............. *H02S 10/40* (2014.12); *H02S 20/30* (2014.12); *H02S 30/20* (2014.12)

(58) Field of Classification Search
CPC .......... H02S 20/30; H02S 10/40; H02S 30/20; F24S 2030/16; F24S 2025/012;
(Continued)

(56) References Cited

U.S. PATENT DOCUMENTS 3,973,745 A * 8/1976 Coltrin ................... B64G 1/222
                                                            244/172.6
4,151,872 A   5/1979 Slysh et al.
(Continued)

FOREIGN PATENT DOCUMENTS

DE   102010041128 A1 * 3/2012 ............. H02S 30/20
JP       2012-131458 A      7/2012
(Continued)

OTHER PUBLICATIONS

JP 2012131458 English machine translation (Year: 2012).*
(Continued)

*Primary Examiner* — Andrew J Golden
(74) *Attorney, Agent, or Firm* — Hovey Williams LLP

(57) ABSTRACT

Method of installation of a PV array with planar PV modules of square/rectangular configuration, each module defining square/rectangular edge and comprising a pair of parallel end and side edges, the modules being connected along adjacent end edges and foldable relative to each other about the connected end edges between a closed condition and an open condition, whereby in the closed condition, the modules are stacked together on a movable carriage on which the modules can be transported, the modules comprising a leading module, a trailing module and two or more intermediate modules, and in the open condition, the modules are laterally displaced from the closed condition about the end edge connections to collect electromagnetic radiation, the method including securing the leading module and moving the carriage relative to the leading module so that the carriage moves away from the leading module, allowing the PV array to unfold from the carriage.

25 Claims, 6 Drawing Sheets

(58) Field of Classification Search
CPC ...... F24S 2025/014; F24S 20/50; F24S 40/10; F24S 40/85
USPC .................................................. 136/243–265
See application file for complete search history.

(56) References Cited

U.S. PATENT DOCUMENTS

| | | | |
|---|---|---|---|
| 9,559,232 B1* | 1/2017 | Naud ....................... | H02S 30/20 |
| 2009/0079161 A1* | 3/2009 | Muchow ................... | F03D 9/32 |
| | | | 280/400 |
| 2009/0320898 A1 | 12/2009 | Gumm | |
| 2011/0253193 A1* | 10/2011 | Korman .................. | H02S 20/30 |
| | | | 136/245 |
| 2011/0284057 A1* | 11/2011 | Swahn .................... | H02S 50/00 |
| | | | 136/251 |
| 2013/0186450 A1* | 7/2013 | Smith ..................... | F24S 20/50 |
| | | | 136/245 |
| 2013/0248467 A1* | 9/2013 | Wever .................... | H02S 20/10 |
| | | | 211/41.1 |
| 2015/0101261 A1* | 4/2015 | Merrifield ................ | B64G 1/22 |
| | | | 52/67 |
| 2015/0179848 A1* | 6/2015 | Korman .................. | H02S 30/20 |
| | | | 29/592.1 |
| 2016/0211795 A1* | 7/2016 | Sun ........................ | H02S 20/30 |
| 2017/0321414 A1* | 11/2017 | Merrifield ................ | E04C 3/02 |
| 2018/0087808 A1* | 3/2018 | Wehrli .................... | F24S 30/20 |

FOREIGN PATENT DOCUMENTS

| | | | | |
|---|---|---|---|---|
| JP | 2012131458 A | | 7/2012 | |
| WO | WO-2015027812 A1 | * | 3/2015 | ............. H02S 30/20 |
| WO | WO-2015074812 A1 | * | 5/2015 | ............. H02S 30/20 |

OTHER PUBLICATIONS

DE-102010041128-A1 English machine translation (Year: 2012).*
International Search Report for International Appln. No. PCT/AU2016/051253; International Filing Date Dec. 16, 2016; dated Mar. 20, 2017.
European Search Report dated Jul. 11, 2019 and all references cited therein.
First Chinese Office Action, Appln. No. 201680082040.2, dated May 27, 2019.
Second Chinese Office Action, Appln. No. 201680082040.2, dated Jan. 22, 2020.
English Translation of Japanese Publ. No. JP2012131458.

\* cited by examiner

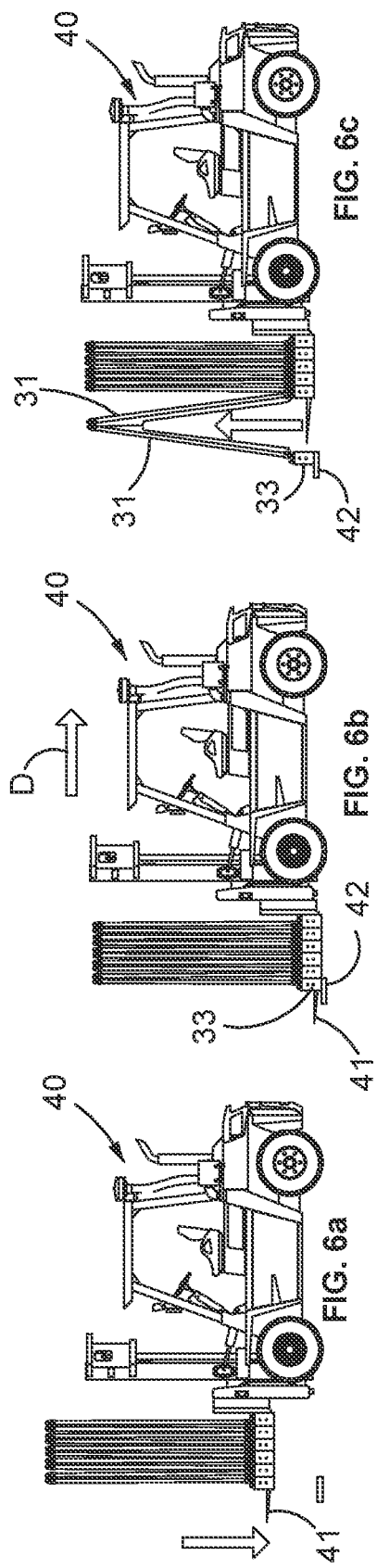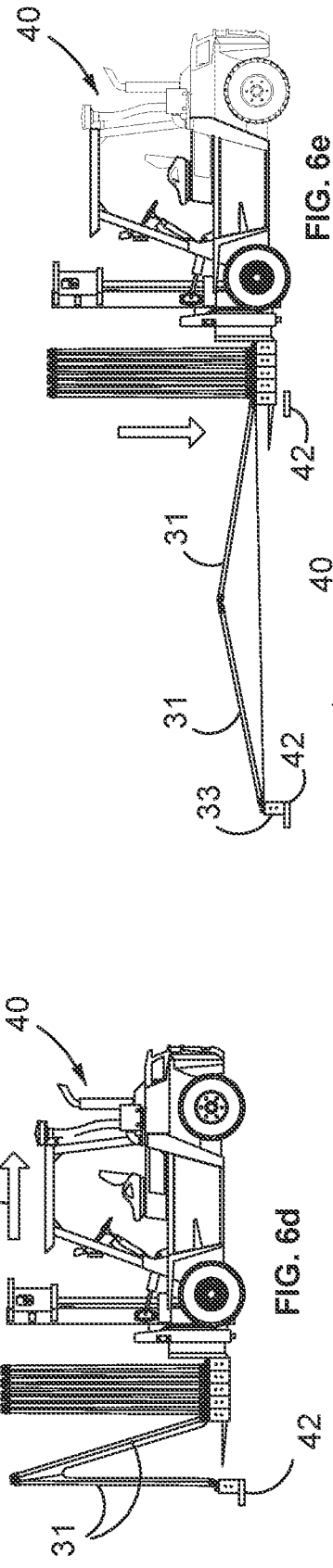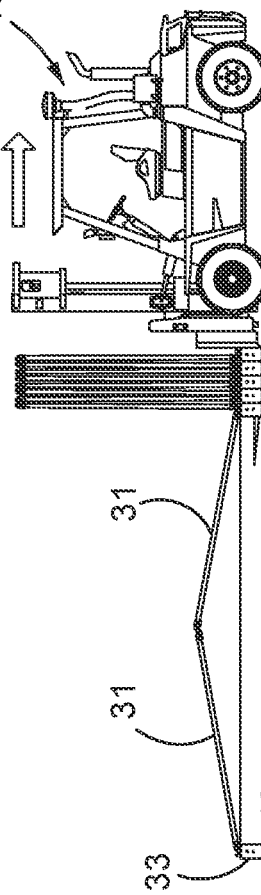

PORTABLE SOLAR PHOTOVOLTAIC ARRAY

CROSS-REFERENCE TO RELATED APPLICATIONS

This is a national stage application under 35 U.S.C. § 371 of International Patent Application No. PCT/AU2016/051253, filed Dec. 16, 2016, which claims priority to Australian Application No. AU 2015905218, filed Dec. 16, 2015, the entire disclosures of which are hereby incorporated by reference herein.

TECHNICAL FIELD

This invention relates to portable or redeployable arrays of solar photovoltaic (PV) modules for the purpose of power generation and in particular relates to methods of installation of such solar PV modules.

BACKGROUND OF INVENTION

Solar PV modules are well known as devices that convert light energy (electromagnetic radiation) directly into usable electric energy via a photoelectric effect. The process of conversion is well known. Solar PV modules can be formed as mountable panels and in that form, the modules have been installed extensively in the domestic and commercial markets, usually on the roofs of domestic dwellings and commercial buildings, to supplement electricity supply from the normal grid supply, or to feed back into the normal grid supply. PV modules comprise a plurality of PV cells that are connected electrically and physically in various configurations to form the PV module (or 'solar panel'), while the module also comprises structural support and environmental encapsulation of the PV cells.

To form a PV system for the purpose of electrical energy generation, PV modules are typically installed on mounting structures and electrically interconnected to form PV arrays, along with other balance of system components (BoS) such as inverters, electrical reticulation, switchgear and protection to complete the system.

PV arrays can be designed and constructed in a variety of ways, however common to all PV arrays is the goal of minimising the cost per unit of energy delivered by the PV system. The two main determinants of the cost of energy from a PV system are capital cost and energy generation.

With the exception of the PV modules themselves, the capital cost of a PV array is driven primarily by the cost of materials in the mounting structure (and therefore the complexity of it) and labour requirements for assembly and installation of the PV array.

In contrast, energy generation from a PV system is highly dependent upon the PV array configuration—that is, the 3D spatial orientation of the modules in the PV array. A PV module generates optimal output when it is positioned at an angle which is normal to the incidence of the sun's rays at any given time. Due to the diurnal and seasonal movement of the sun, this results in the modules of a PV array being either mounted on a structure which tracks the path of the sun diurnally and/or seasonally to achieve optimal generation most or all of the time, or otherwise the modules are fixed at a tilt and orientation which in a compromise, nevertheless achieves the maximum possible annual generation without tracking.

PV arrays that are installed to track the path of the sun include dual axis tracking PV arrays (which track diurnally and seasonally) which have the highest capital cost but the highest generation yield, single axis inclined tracking (which track diurnally but not seasonally), and single axis horizontal tracking (which also track diurnally but not seasonally). Non tracking PV arrays are fixed arrays which provide the lowest cost but also lowest energy generation. These include flat arrays, whereby the modules are laid out in a planar configuration and more recently, East-West (EW) PV arrays (which are a subset of fixed PV arrays).

Tracking PV arrays seek to increase the energy yield of a PV array by ensuring the PV modules are orientated as close to an angle normal to the radiation of the sun as possible at any given time. This is achieved by a mechanical (or sometimes hydraulic) mounting structure which moves the PV modules in one or two axis over the course of the sunlight hours.

A fixed PV array currently represents an effective compromise of cost, complexity and operational risk of the PV array with energy generation. In a fixed PV array the PV modules remain fixed for the life of the PV system, so therefore an orientation must be chosen which achieves the maximum generation possible from the fixed PV array in the absence of tracking. The orientation of the PV array (including the tilt angle) is often dictated by the structure to which the PV array is fixed. As this is often a roof, often the orientation is not optimal depending on which way the roof faces and the incline of the roof.

An EW configuration essentially splits a planar PV array into two sub-arrays of PV modules, one sub-array orientated towards the east and the other sub-array orientated towards the west. The modules can be arranged in end-to-end connection or alignment as a series of successive triangles each made up of one east-facing and one west-facing module. An EW PV array achieves a capital cost lower than a fixed PV array, due to reduced structural requirements (due to lower wind loadings and more integrated structure), reduced foundation requirements, and reduced array footprint. The downside though is the reduced energy generation due to the non-optimal fixed orientation. Until recently, the cost benefit of the reduced structural requirements did not justify the reduced energy generation, however as PV module cost continues to fall, this balance has changed and in certain applications the EW approach can result in a lower cost of energy than conventional fixed PV arrays.

Pre-assembled PV arrays have advantages in relation to reduced installation labour and construction timeframe requirements, while portable PV arrays enable use of PV systems in shorter term applications at different locations. Currently, two groups of PV arrays exist that could be described as pre-assembled or portable PV systems.

The first is a collection of low-voltage portable systems designed for use whilst camping, in military exercises, or essentially anywhere where temporary or short term energy generation is required. These systems typically are of small power generation capability, physically small and have the PV modules oriented on a single plane to maximize energy yield (i.e not EW configuration). This group of products is largely irrelevant to the present invention.

The second group of products, which are more relevant to the invention, are larger scale pre-assembled PV arrays that include a folding structure to enable the PV array to be portable. These systems are typically more expensive than a conventional fixed or EW PV array and have PV modules mounted to a complex sub-structure which includes articulated joints for unfolding the array of modules. These systems are planar systems rather than EW systems.

Portable systems of the second group of products are costly and therefore do not provide low cost of energy. They are therefore typically only used in bespoke applications which can justify the added cost necessary to achieve the desired portability of the PV system.

The present applicant is also the applicant of co-pending International PCT Patent Application No PCT/AU2015/050603 (WO/2016/049710). The invention of that application was developed to provide a portable PV module array that employs an EW PV array in an operational configuration and that has cost and/or installation benefits compared to present portable PV arrays. While the present invention has some relation to the invention of PCT/AU2015/050603, it is directed to a method of installation of a PV array that can be employed to install a portable PV module array into both an EW PV array and a non-EW PV array. The invention of the present application is intended to provide an improved method of installation that has advantages in terms of speed, and therefore the total cost of installation. The invention of the present application also provides some new forms of PV arrays not disclosed in PCT/AU2015/050603.

SUMMARY OF INVENTION

In accordance with one embodiment of the invention, there is provided a method of installation of a PV array whereby;

the PV array comprises at least four planar PV modules which are of generally square or rectangular configuration so that each module defines a generally square or rectangular edge of substantially the same dimensions and comprising a pair of substantially parallel end edges and a pair of substantially parallel side edges, the modules being connected along adjacent end edges and being foldable relative to each other about the connected end edges between a closed condition and an open condition, whereby in the closed condition, the modules are stacked together on a movable carriage on which the modules can be transported, the modules comprising a leading module, a trailing module and two or more intermediate modules, and whereby in the open condition, the modules are laterally displaced from the closed condition about the end edge connections for collection of electromagnetic radiation, the method including securing the leading module and moving the carriage relative to the leading module so that the carriage moves away from the leading module, and allowing the PV array to unfold from the carriage.

The method of the invention is advantageous in that the PV modules can be unfolded from the closed condition as the carriage moves. This means that the carriage supports the weight of the PV modules that remain on the carriage as other PV modules are unfolded. Moreover, there is no necessity for the unfolded PV modules to be dragged along the support surface in order to unfold the PV modules that remain in the closed condition on the carriage. It is noted that some prior art installation methods involve pulling the leading PV module from the stack of PV modules in the closed condition and continuing to pull that module as successive modules are released from the closed condition towards or to the open condition. This ultimately can involve pulling the entire weight of the PV array to reach the open condition. This is more likely to cause damage to the individual PV modules, particularly if the support surface is rough (ground for example) because all of the PV modules of the PV array are dragged over the support surface until the PV array reaches the fully installed condition (the open condition).

In contrast, the method of the present invention allows for the end edge of the leading PV module to be secured, such as by placing on the support surface and thereafter, no further movement of that end edge on the support surface is required other than pivoting movement as the leading PV module is unfolded to the open condition. The leading PV module will not need to traverse along the support surface and in particular, will not need to be dragged along that surface.

While the leading module can be secured by placing an end edge of the leading module on a surface on which the PV array is to be installed, greater security can be achieved by the use of one or more abutments that engage against a surface of the leading module that faces in the direction of movement of the carriage. The one or more abutments will prevent the leading module from sliding in the direction of movement of the carriage and that allows the required relative movement of the carriage away from the leading module. In this arrangement, the surface on which the PV array is to be installed will often be a ground surface and the one or more abutments can be pegs that are driven into the ground surface.

Alternatively, the leading module can be secured by a connection made between the leading module and a stationary anchor. The connection can be by rope or chain for example that extend between the leading module and an anchor such as a post or peg, or even the transport vehicle that transports the PV array to the installation site.

The PV modules of the PV array can be stacked together in the closed condition with the PV modules at an angle to each other, or in a generally parallel and close facing relationship with the edges of the modules in general alignment, or in a mixture or combination of both. The PV modules can be stacked with the leading PV module and the PV module attached to the leading PV module at an angle to each other and with the remaining PV modules in a generally parallel and close facing relationship. This latter form of stacking can be useful to place the end edge of the leading PV module at or close to the position at which it will be placed on a surface on which the PV array is to be installed. This will minimise the movement of the leading PV module that is required to be made when the PV array reaches the location of installation.

It is to be noted that the PV array can comprise a plurality of single modules connected end to end to form an elongate column, or it can comprise a plurality of multiple module groups which are groups of two or more modules that are connected side to side to form a row, with those module groups being connected end to end to form an elongate column. A PV array formed from a column of module groups will be wider than an array formed from a column having single modules. It is envisaged that connection of modules in a row to form module groups could comprise 2, 3, 4 or more individual modules while the end to end connection of module groups to form a column could comprise from 2 module groups upwards, such as 8, 10, 12 or more module groups.

The PV modules of the entire PV array can unfold together or simultaneously, so that as soon as the leading PV module is secured and the carriage commences movement away from the leading module, the modules of the entire PV array can commence unfolding movement to the open condition.

However, in alternative and advantageous forms of the invention, the method of the invention is arranged to shift only two PV modules from the closed condition to the open condition at a time. Thus, in some forms of the invention, the PV modules can be unfolded two at a time, so that two PV modules are unfolded from the closed condition to the open condition before the next pair of PV modules shift from the closed condition. In this form of the invention, the leading PV module and the PV module to which the leading PV module is connected can be fully shifted from the closed condition to the open condition, before the next pair of PV modules shift from the closed condition. Once the leading PV module and the PV module connected to it have reached the open condition, the next pair of PV modules can commence the unfolding process. This retains the advantage discussed above that the PV modules that remain in the closed condition remain supported on the carriage, whereas if all of the PV modules unfold at the same time, they shift from being supported by the carriage more quickly and will be drawn or dragged across the support surface as they assume the open condition.

In some forms of the invention, all of the PV modules are supported on the carriage until the carriage reaches the position at which the modules are to be unfolded to the open condition. At that point, the leading PV module can be moved manually or mechanically (by a winch for example) from the closed condition to be placed on the surface on which the PV array is to be installed, with the PV module to which the leading PV module is connected also unfolding as the leading PV module is moved. The intermediate modules and the trailing module can remain in the closed condition without any unfolding movement.

In other forms of the invention, the leading PV module can be supported on the carriage in a position in which it is immediately placeable on the support surface when the carriage reaches the position at which the modules are to be unfolded to the open condition. That is, the leading PV module and the PV module to which the leading PV module is connected could be displaced from the stack of PV modules on the carriage that are in a generally parallel and close facing relationship immediately that the carriage reaches the position at which the modules are to be unfolded to the open condition and without requiring movement of any of the stack of PV modules.

The carriage can have any suitable form of construction. In one form, the carriage is one that supports the folded PV array and which can be lifted from a transport vehicle, such as a truck or utility vehicle for example, with the PV array onto the ground surface and can thereafter be shifted as described above in order to unfold the PV array. The carriage could include lifting lugs to be lifted by a suitable crane, or could include fork tynes to be lifted by a forklift. Alternatively, the carriage could simply be slid off a transport vehicle, such as on metal skids.

Alternatively, the carriage could itself be a forklift. The unfolded PV array could, for example, be liftable by the fork tynes of a forklift and the method of the invention could involve securing the leading PV module in place on the relevant support surface and driving the forklift away from the leading PV module to allow the PV array to unfold. In this arrangement, the forklift could be employed to lift the PV array from a transport vehicle and to lower the PV array so that the leading module can be placed or secured on the support surface and that could occur with the forklift tynes lowered so that the tynes and/or the PV array rest on the support surface, or the tynes could be elevated slightly so that the PV array that remains on the tynes is also slightly elevated. Regardless, the forklift can be moved in the required direction with the PV array and tynes elevated above the support surface so that there is no dragging of the PV array across the support surface. At each point at which an edge of a PV module is to be shifted from the PV array into support or engagement with the support surface, the tynes could be lowered to a position either on the support surface or slightly above it, so as to minimise the distance that the edge of the relevant PV module needs to be moved and lowered to engage or be positioned on the support surface. This method of the use of a forklift is highly advantageous, given that in many locations in which a PV array according to the invention is to be installed, forklift access will be available.

Still further, the actual transport vehicle could operate as the carriage in other forms of the invention. Thus, the PV array could be transported to the installation location on a tray or bed of the transport vehicle and the leading PV module could be moved from the stack of PV modules to a position in contact with the support surface. This would most likely also involve movement of the PV module to which the leading PV module is connected. The transport vehicle could then be driven in a direction to allow the leading PV module and the PV module to which the leading PV module is connected to move to and assume an open position. The remaining PV modules of the PV array could be opened in this manner. Skids could be employed between the surface of the transport vehicle on which the PV array is supported and the support surface to which the PV array is to be installed, to lower the PV modules as required during the opening movement of the PV array.

In some forms of the invention, the end edges of the PV modules will be slid or dragged across the support surface as a pair of PV modules move between the closed and open positions. The unique method of the invention means that if this sliding or dragging movement is in fact required, it is limited to just movement between pairs of connected PV modules rather than to the entire PV array. However, the method of the invention contemplates the use of rails, such as steel rails on the support surface, running in the direction of opening and closing in order to minimise the frictional resistance to that movement. The rails can be low-friction beams, or beams with rollers on which the PV modules roll.

In one of the above forms of the invention whereby a forklift is used to form the carriage, or indeed in other forms of the invention where the PV array can be lifted and transported via a forklift regardless of the manner in which the PV array is shifted between the open and closed positions, it can be advantageous for the PV array to include pockets or openings to accept the tynes of a forklift and these can be provided in any suitable form at any suitable position on the PV array. In some forms of the invention, tyne openings are provided at the connection between adjacent end edges of two PV modules and the arrangement can be such that those connections are provided at the top of the PV array, or at the bottom of the PV array, or a combination of both. Thus, with the openings provided at the top of the PV array, a forklift could lift the PV array from above. Likewise, with the openings provided at the bottom of the PV array, a forklift could lift the PV array from the bottom. In current arrangements, tyne openings provided at the bottom of a PV array is the preferred arrangement.

Where tyne openings are provided at the connection between adjacent end edges of two PV modules, the openings can be provided at each of the connections at either or both of the top or bottom of the PV array or the openings could be provided only a selection of the connections at the top or bottom of the PV array. For example, if the openings were provided at the bottom of the PV array, and if the bottom of the PV array includes six connections between adjacent end edges of adjacent PV modules, then tyne openings could be provided at only two of the connections or three of the connections for example.

As indicated above, the openings can be provided in any suitable form and in some forms of the invention, openings have been provided in beams that extend laterally across the PV array along the end edges of one or more of the PV modules. The beams can be formed from any suitable material, including metal, polymer or plastic, timber or concrete. At present, concrete beams are preferred as these can be cast with the tyne openings in place and also provide a mass or weight that assists to securely position the PV array in an opened and installed position, while they can also provide structural rigidity in the direction transverse to the direction in which the PV array is opened and closed. Still further, where hinges are formed between adjacent end edges or adjacent PV modules, these can be cast into the concrete beams and thus the hinges can be securely mounted within those beams.

The structural rigidity that a beam can provide and which a concrete beam in particular can provide via its significant weight, can be of great assistance when the PV array is installed on uneven land. Such an installation often tends to introduce twisting loads lateral to the lengthwise extent of the installed PV array and the use of beams, in particular concrete beams, and resist those twisting loads. Twisting loads can place loads on the connections between adjacent PV modules and can distort those connections, or even cause those connections to fail. Where either of these occurs, damage to the PV modules can also be inflicted.

BRIEF DESCRIPTION OF THE DRAWINGS

In order that the invention may be more fully understood, some embodiments will now be described with reference to the figures in which:

FIGS. 6*a* to 6*f* show the PV array of FIG. 5 in progressively being unfolded to an open condition.

DETAILED DESCRIPTION

Figure 1:
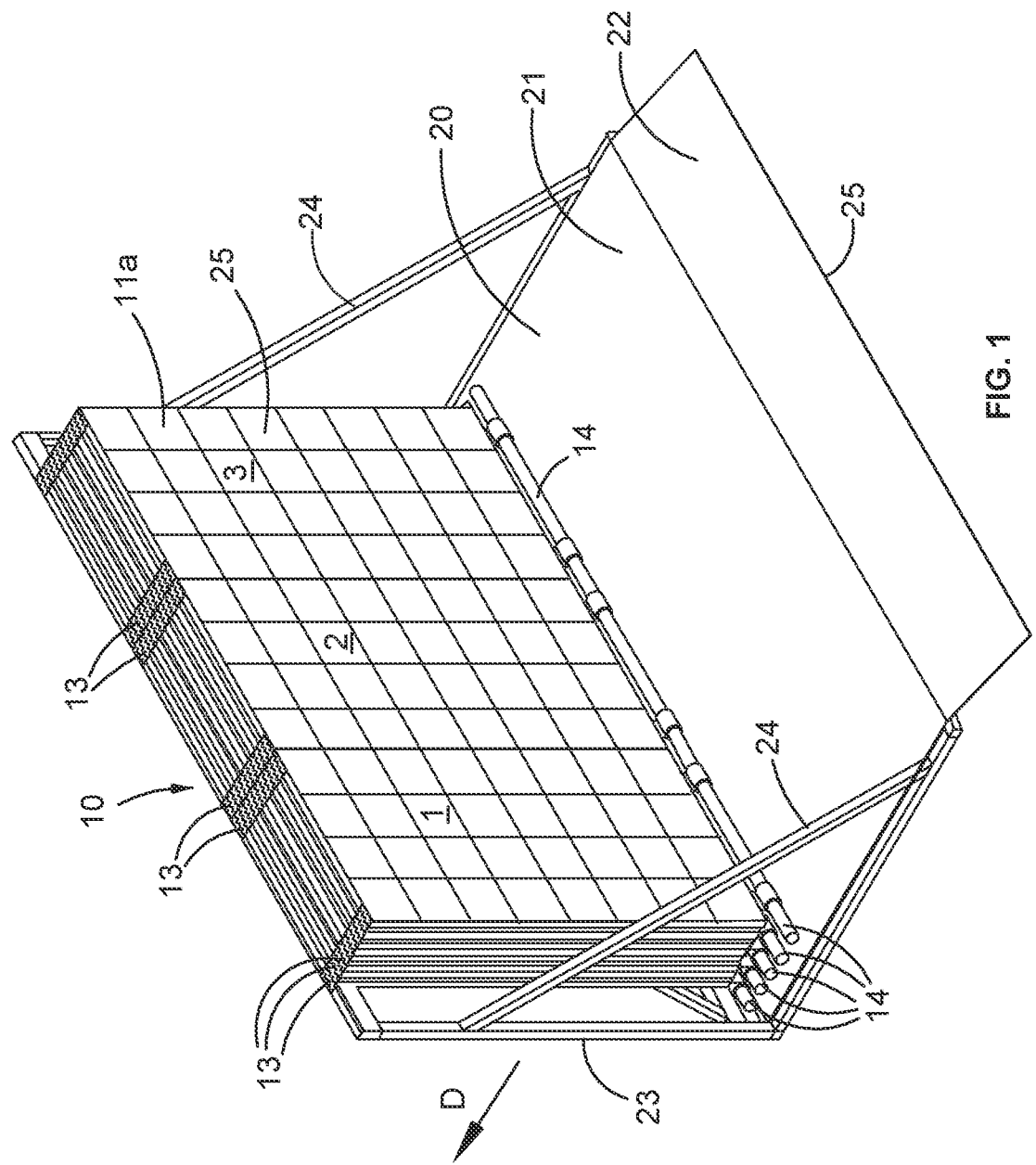
FIG. 1 illustrates a PV array in a closed condition.
Figure 2:
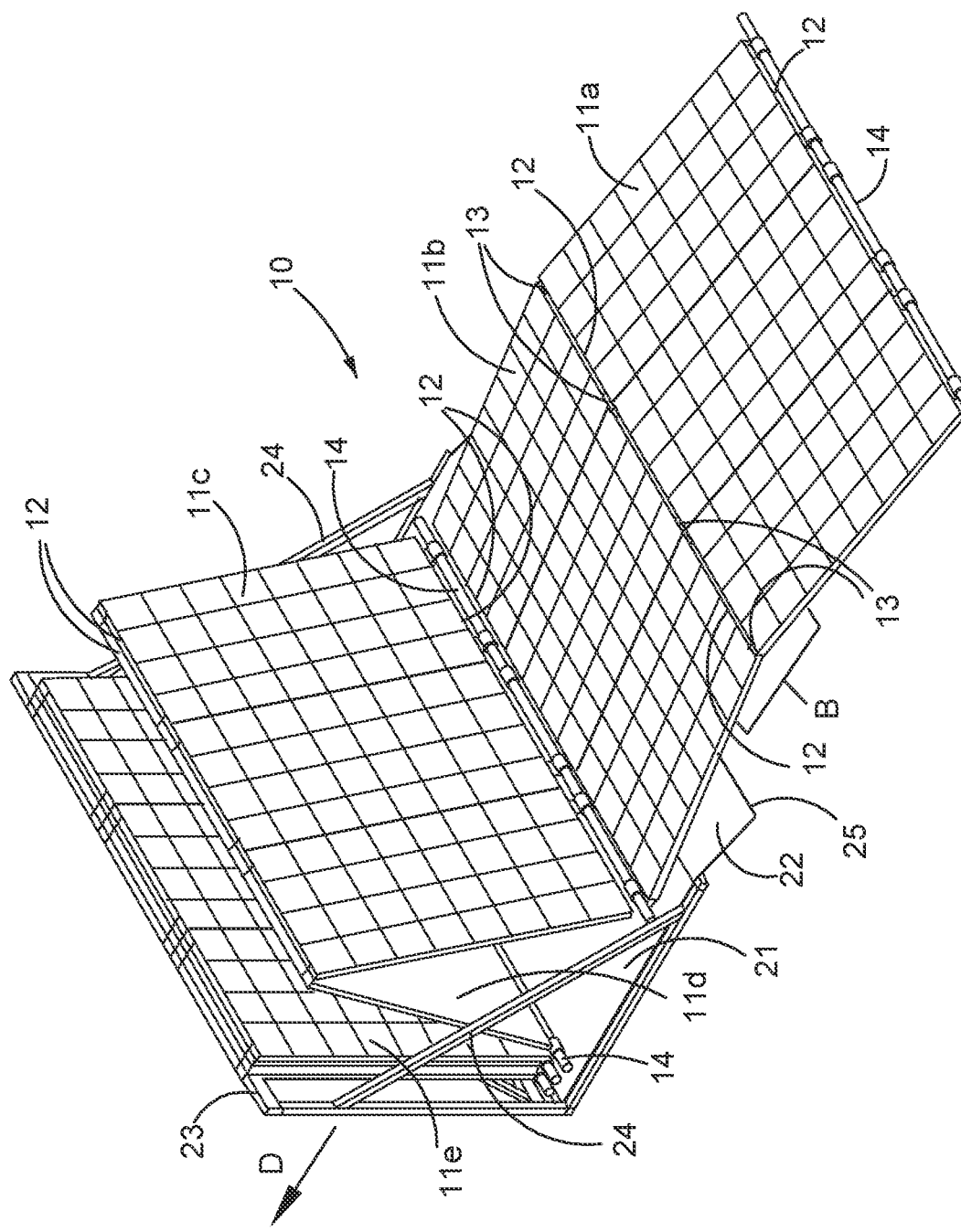
FIGS. 2 to 4 show the PV array of FIG. 1 in progressively being unfolded to an open condition.
Figure 3:
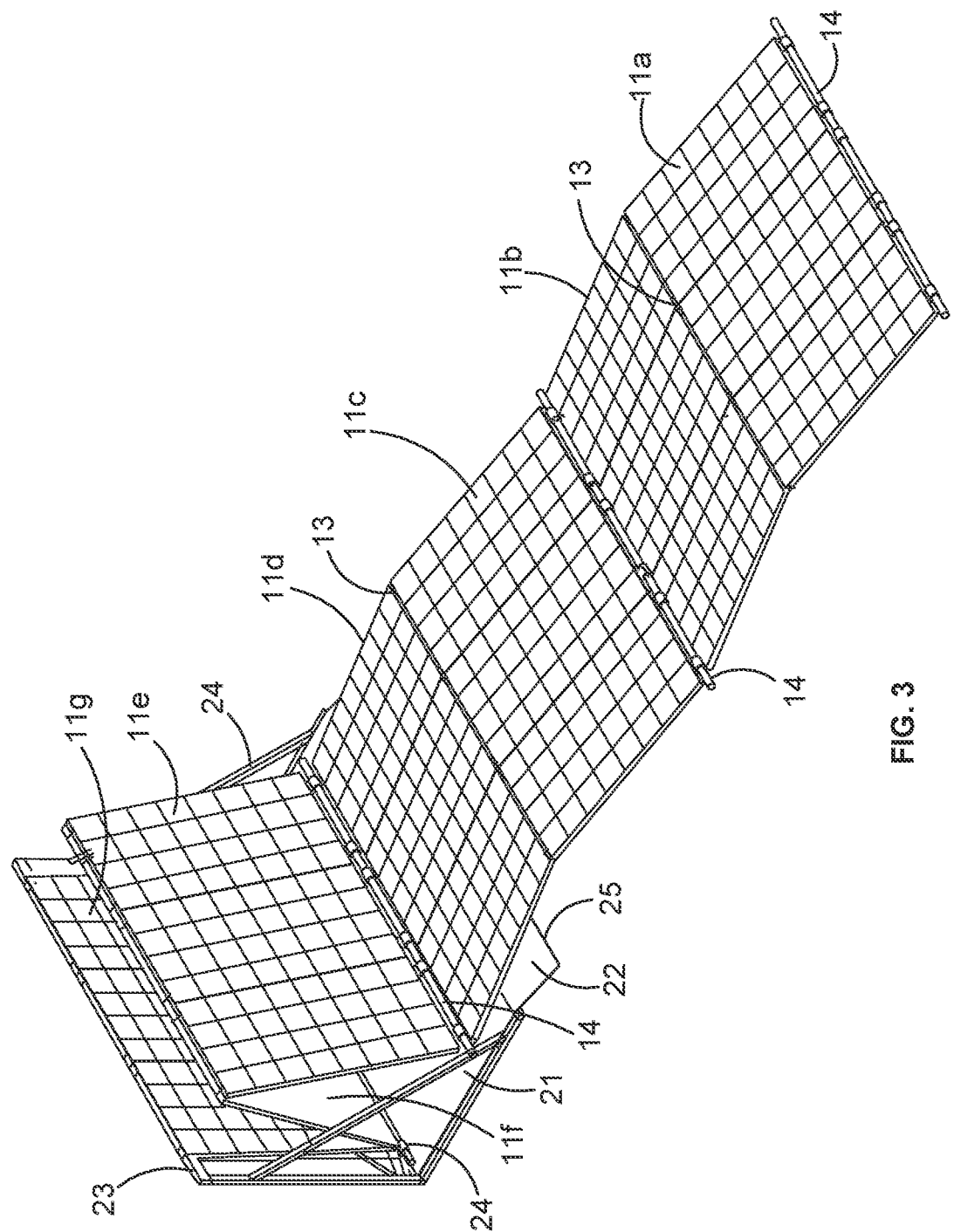
Figure 4:
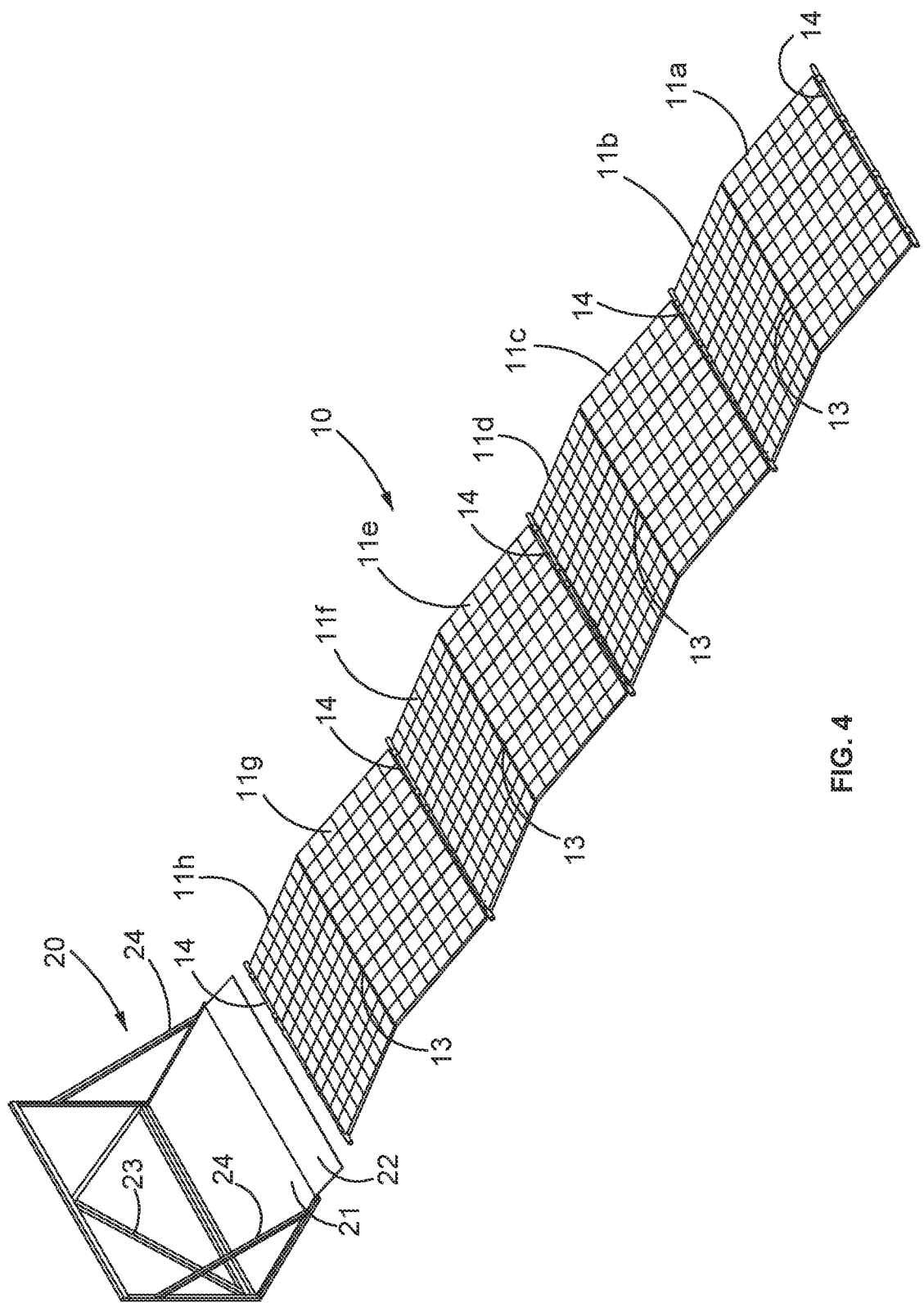

FIG. 1 illustrates a PV array 10 which comprises a plurality of PV module groups 11 (referred to as groups 11*a* to 11*h* as shown in FIGS. 2 to 4), and which each comprise three individual, commercially available PV modules numbered 1, 2 and 3, that are arranged in a row side by side and that are connected along end edges by hinges 13 and 14 to form a column when the PV array 10 is extended (see FIG. 4). Each individual PV module is of rectangular configuration with the long edges of each module in each module group being adjacent each other. The module groups will be referred hereinafter as "modules" for ease of description.

The modules are connected along end edges 12 (see FIG. 2) by the hinges 13 at one end and by hinges 14 at the opposite end. The connection between end edges differs depending on whether the connection is made at a bottom end edge of the modules as shown in FIGS. 1 and 2, or a top end edge. It can be seen from FIGS. 1 and 2, that the top end edges 12 of the modules 11 are hingedly connected together by hinges 13, whereas the bottom end edges 12 are connected together by a different form of hinge 14. The hinges 14 are provided for constructions reasons, as they provide an anchor point for a tether arrangement which allows the PV array 10 to assume an EW orientation in the open condition of the array 10 as shown in FIG. 4. This arrangement is disclosed in the co-pending International Patent Application No. PCT/AU2015/050603 mentioned above and that disclosure is therefore incorporated herein by cross-reference so as to remove the need to restate that disclosure herein.

Suffice to say, that the PV modules 11 of the PV array 10 are connected by hinges 13 and 14 at opposite end edges 12 to form a column, so that the array 10 can assume the closed or stacked position of FIG. 1 and the open position of FIG. 4, and the intermediate positions of FIGS. 2 and 3.

The PV array 10 is shown supported on a carriage 20 which includes a base 21, a front edge 22 a rear support structure 23 and bracing members 24. The base 21 can be a sheet metal base, as can the front edge 22, or different arrangements can be employed. The PV array 10 can be transported on the carriage 20 or it can be placed on the carriage 20 at the site of installation.

It is to be noted that a single carriage could be employed to install any number of PV arrays. A plurality of PV arrays could be transported to the installation site and could be installed separately by the one carriage. One or more arrays could be loaded onto the carriage and installed and thereafter, further arrays could be loaded onto the carriage and installed.

The PV modules 11 are shown in a closed condition in FIG. 1, in which the modules 11 are stacked together in generally parallel and close facing relationship, with the edges 12 of the modules 11 in general alignment. While FIG. 1 comprises eight modules 11 (comprising 8×3 individual PV modules so that the total number of individual PV modules shown in FIG. 1 is 24 PV modules), it can be seen that the depth of the base 21 of the carriage 20 could support a greater number of modules (subject to not exceeding a maximum weight loading), and so a greater number of modules 11 could be assembled on the base 21. These could all be assembled in hinged connection, or these could comprise separated groups of hingedly connected modules.

The front edge 22 of the carriage 20 is optional but assists installation of the modules 11 to the open condition of FIG. 4 as will later be described. The front edge 22 can be hingedly connected to the facing edge of the base 21, so that it can be rotated upwardly either to project generally vertically, or to rotate through slightly more than 180° to lie flat against the upper surface of the base 21. Either of those positions of the front edge 22 can be adopted when the PV array 10 and carriage 20 are in storage or transport to make the overall package more compact. The front edge 22 can be lowered to the position shown in the figures just prior to unfolding the PV array 10 into an open condition.

It is intended that the carriage 20 include skids or wheels, so that it can be manoeuvred into position over a support surface with the modules 11 shown in the closed condition and prior to the modules 11 being unfolded to the open position. Alternative arrangements could include rollers or casters. Alternatively, as indicated above, the PV array 10 could be loaded onto the carriage 20 at the site of installation with the carriage already on the support surface.

Also, it is likely that the carriage 20 will be lifted by crane or forklift onto transport equipment (a tray truck for example) and so lifting points or other suitable structure can be included to facilitate forklift or crane movement.

The carriage 20 as shown in FIG. 1 supports the PV array 10 and can be employed to store the PV array 10 in the closed condition as shown and to transport the array 10 in that same condition. Once at the site at which the PV array 10 is to be installed, the method of the invention can be employed to unfold the PV array 10 to the position shown in FIG. 4. For this, the leading module 11*a* is secured so that the carriage can be moved relative to the module 11*a*. In the forms of the invention that is illustrated, the module 11*a* is shifted from the position shown in FIG. 1 towards and past the front edge 22 of the carriage 20 and onto the supporting surface on which the PV array 10 is to be positioned. That movement can be manually by hand, or by a winch or other method. The benefit of the front edge 22 is that it provides gentle ramp from the base 21 onto the supporting surface.

The hinge 14 which is attached to the end edge 12 of the module 11*a* is placed on the supporting surface on which the carriage 20 is supported, which typically might be a ground surface such as a grass or dirt surface. The movement of the module 11*a* away from the stack of modules 11 shown in FIG. 1 can be made through movement of that module 11*a*, as well as the immediately adjacent module 11*b* to which the module 11*a* is hingedly connected by hinges 13. There is no need for any of the other remaining modules to shift from the stacked condition in FIG. 1, so that the remaining modules 11 can remain generally parallel and in close facing relationship. Advantageously, this means that the movement of the modules 11*a* and 11*b* is the only movement that is required and thus the effort of movement is minimised to the effort required to move just two modules. Moreover, the initial movement, whether it be by manual or mechanical effort, needs only to bring the hinge 14 of the module 11*a* into contact with the ground surface just beyond the free edge 25 of the front edge 22. The movement required would therefore need to be sufficient to incline the modules 11*a* and 11*b* at about 35° to each other. This could vary depending on the number of modules and the relative size of the carriage and in some forms of the invention, the PV array would almost fill the carriage and so only a very small movement, 10' for example, would be required.

It is to be noted that the modules 11*a* and 11*b* could be positioned at an angle to each other in the closed condition of the modules 11, with the remaining modules 11*c* to 11*h* in generally parallel and close facing relationship. The hinge 14 of the leading module could be positioned at the junction between the base 21 and the front edge 22 so that only a small further movement of the leading module needs to be made to place the hinge 14 on the supporting surface just beyond the free edge 25 of the front edge 22.

Once the hinge 14 of the module 11*a* has been placed just beyond the free edge 25 of the front edge 22, the carriage 20 can be moved relative to the modules 11*a* and 11*b*. In the figures, the direction of carriage movement is in the direction D. That carriage movement can be made by any suitable arrangement, but given the weight of the carriage in supporting the PV modules 11, mechanically assisted movement is most likely required. That mechanical movement could be provided by a winch, which might be attached to a vehicle, such as the transport vehicle that has transported the PV array 10 and carriage 20 to the installation site. Alternatively, a vehicle could tow the carriage 20 such as by an attachment made to the rear of a vehicle. Still alternatively, the carriage could include wheels that can be rotated manually such as through a geared reduction, so that the carriage can be moved manually in the direction D. This latter arrangement could also be driven by an electric motor for example, whereby the carriage has its own battery power source or power is sourced from a vehicle of the kind discussed above.

However the carriage 20 is moved, that movement will further unfold the modules 11*a* and 11*b* until they reach an operational position in the open condition. In relation to FIG. 2, the modules 11*a* and 11*b* are shown in an operational position, in which the respective modules are formed in an EW configuration in which the angle β is approximately 160°. That angular orientation between the modules 11*a* and 11*b* is achieved through a structure that resists further unfolding between the respective modules and this arrangement is the subject of disclosure in International Patent Application No. PCT/AU2015/050603. The angular orientation between modules can be different to that shown in the figures or the modules can alternatively be laid flat.

It will be appreciated that the unfolding that takes place between FIGS. 1 and 2 requires that the hinge 14 of the module 11*a* remains stationary relative to the movement of the carriage 20 once the hinge 14 has been placed on the support surface. In order to achieve this, pegs can be employed to secure the hinge 14 of the module 11*a* on the support surface, or other arrangements can be employed. Alternatively, if the weight of the modules 11 is sufficient, then the module 11*a* will remain stationary relative to movement of the carriage 20 without requiring further support.

Alternatively, a chain or rope could be connected to the module 11*a* and fixed to an anchor to facilitate movement of the carriage 20 relative to the module 11*a*.

With the modules 11*a* and 11*b* in the open condition as shown in FIG. 2, further movement of the carriage 20 in the direction D, will shift the modules 11*c* and 11*d* away from the stack of modules of FIG. 1. The modules 11*c* and 11*d* will start to incline relative to each other and as the carriage 20 continues to move, the inclination will increase as the hinge 14 between the modules 11*b* and 11*c* shifts towards, over and beyond the front edge 22 of the carriage 20. Relative movement between the modules 11*c* and 11*d* will continue until they reach the relative angular configuration equal to the modules 11*a* and 11*b*. As soon as that angular configuration is reached, then the next pair of modules, 11*e* and 11*f* will commence the shifting movement as the carriage 20 continues to move in the direction D. This process is evident in FIG. 3, in which the hinge 14 between the modules 11*b* and 11*c* is positioned well beyond the front edge 22 of the carriage 20 and movement of the next two modules 11*e* and 11*f* from the position shown in FIG. 1 has commenced.

The movement discussed above continues until all of the modules 11*a* to 11*h* have been shifted to the open condition as shown in FIG. 4. In FIG. 4, it can be seen that the hinge 14 at the free edge of the PV module 11*h* is no longer supported by the carriage 20. Therefore the carriage 20 can be moved away from the PV array 10 until the PV array 10 is to be returned to the closed condition of FIG. 1.

It will be appreciated that a major advantage of the invention is that unloading of the PV array 10 from the carriage 20 is made without dragging the individual PV modules 11 along the support surface. Rather, once the hinge 14 of the module 11*a* is placed on the supporting surface just beyond the free end 25 of the front edge 22 of the carriage 20, movement of the carriage 20 in the direction D allows the PV array 10 to be unfolded to the position shown in FIG. 4. Movement of the modules is from the generally parallel and close facing relationship of FIG. 1 to the operational EW position and once in that position, no further movement of the modules is required. Thus, adjacent pairs of modules simply move from the stacked or closed position of FIG. 1 to the angled or opened condition of FIGS. 2 to 4 and are not dragged or otherwise moved across the supporting surface. This has major benefits in terms of the limitation of damage to PV modules as they are installed and facilitates easy installation, given that the array of modules is not required to be dragged along the supporting surface. Also, the installation method is safe for installation personnel given that they are not required to handle the PV modules except for the initial movement of the module 11a.

Return of the PV modules 11 to the closed condition of FIG. 1 is achieved by reversing the installation procedure. Thus, the carriage 20 is moved in the reversed direction to that shown in FIGS. 2 to 4, so that the hinge 14 of the module 11h slides up the front edge 22 of the carriage 20 and along the base 21 until it reaches the base of the rear support structure 23. At that point, further movement of the carriage 20 will start to lift the apex at the hinge 13 between the modules 11h and 11g until such time as those modules have reached a generally parallel and close facing relationship. That position is shown in FIG. 3, in which the module 11g extends generally parallel to the general plane of the rear support structure 23. Continued movement of the carriage 20 will have the same effect in relation to modules 11f and 11e and after sufficient movement, those modules will pivot upwardly into the position shown in FIG. 2. The sequence continues until the hinge 14 of the leading module 11a reaches the front edge of the free edge of the front edge 22 and thereafter, the final collapse of the modules 11b and 11a can be made manually or mechanically to bring the PV array 10 back to the closed condition shown in FIG. 1.

Again, in collapsing or folding the PV array 10 into the closed condition, there is no need to drag the array as in prior art arrangements but rather, the array is caused to collapse without dragging by movement of the carriage 20.

It will be appreciated that when the PV array 10 as shown in FIG. 4 is to be collapsed into the closed condition, pegging or otherwise securing the hinge 14 at the free edge of the module 11a could be required to ensure that the array 10 does not shift in the direction of travel of the carriage 20 (the direction opposite the direction D of the figures). However, that pegging is not expected to be always necessary, given that the weight of the PV modules themselves is expected to firmly secure those modules against sliding movement on the support surface. Clearly, the type of support surface will have an effect on this, such that if the support surface is a timber or concrete surface for example, the likelihood of movement of the PV modules is greater than if the support surface is a grass or soil surface.

Figure 5:
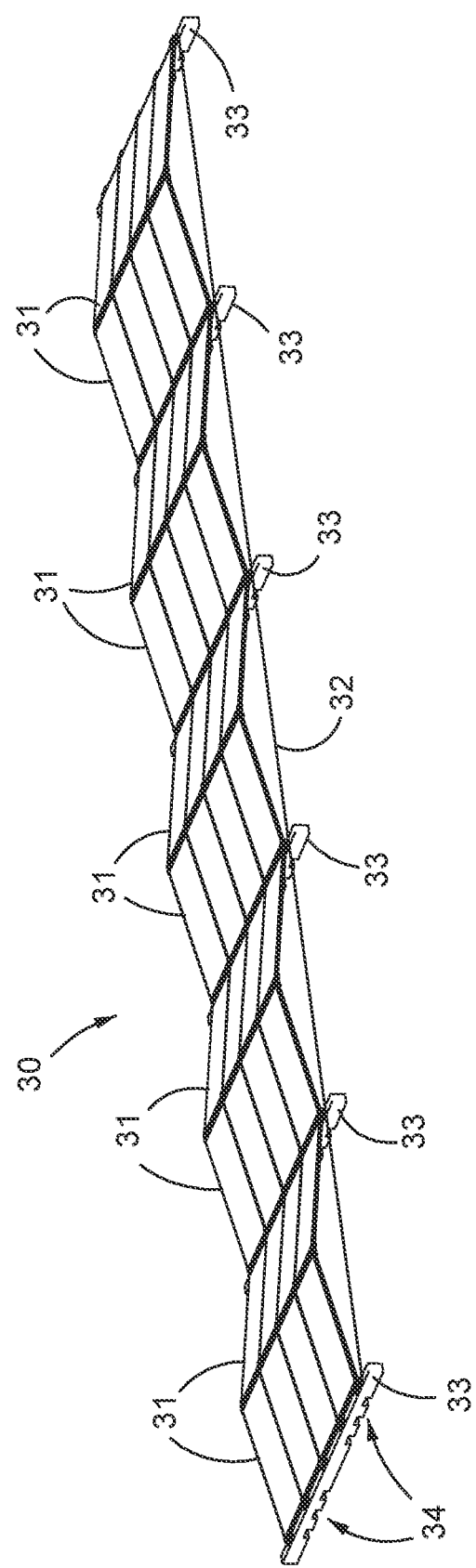
FIG. 5 illustrates a different form of PV array from the earlier figures in an open condition.

FIG. 5 illustrates a PV array 30 that includes a plurality of PV modules 31 shown in an open condition similar to the arrangement illustrated in FIG. 4. The modules 31 are all disposed at the same angle to each other and are retained in that position by a flexible tether 32. Discussion of the use of a tether is found in International Patent Application No. PCT/AU2015/050603.

A major difference between the PV array 30 of FIG. 5 and the PV array 10 of the earlier figures is via the use concrete rails 33 which are provided at each of the ends of the array 30 and at the hinged connections between adjacent modules 31 that otherwise engage against the ground surface.

The rails 33 could be formed from other materials of the kind mentioned earlier herein, but advantageously, formation of the rails 33 from concrete allows forklift tyne openings 34 to be cast into the rail and to provide access for forklift manipulation of the modules 31 of the array 30. Each of the rails 33 as shown in FIG. 5 includes the tyne openings 34 and the provision of those openings allows a forklift to engage a single rail 33 and to shift the modules 31 attached to that rail towards open or closed positions. As the modules 31 move to or towards the closed or stacked position (essentially the same as that shown in FIG. 1), the forklift tynes can engage increasingly more of the rails 33.

The openings 34 shown in FIG. 5 include two sets of three openings and this provides some flexibility in terms of the tyne spacing of different forklifts.

As indicated earlier, the rails 33 can also provide a form of ballast for the PV array 30 in order to securely locate the PV array 30 in place, while it also provides structural rigidity against twisting movement about the longitudinal axis of the array 30.

With reference to FIGS. 6a to 6f, another method of installation is illustrated in relation to the PV array 30. In FIG. 6a, a closed or stacked PV array 30 is illustrated being supported completely by a forklift 40 on the tynes 41 of the forklift. The array 30 might have been lifted from a transport vehicle by the forklift 40, or might have been lifted from the ground, but regardless, the PV array 30 is elevated and is available to be shifted to an installation site for the commencement of installation.

In FIG. 6b, the PV array 40 has been lowered from the position in FIG. 6a so that the leading rail 33 is positioned on a support surface 42. Of course all of the other rails 33 are also lowered to the same height but only the leading rail 33 engages the support surface 42.

With the leading rail 33 supported on the surface 42, the forklift is moved in the direction of arrow D (FIG. 6b) and FIG. 6c shows that the pair of leading modules 31 move to a position in which they are slightly open relative to each other. The remaining modules 31 remain in the stacked condition of FIGS. 6a and 6b.

From the position shown in FIG. 6c, the stacked modules 31 can be lifted slightly to the position as shown in FIG. 6d and further movement in the direction D can be undertaken. The lifting of the stacked modules 31 ensures that there is no dragging of the stacked modules across the support surface, particularly where the support surface might be uneven.

FIG. 6e shows the forklift 40 having been moved to the next supporting surface 42 and at the position at which the angled modules 31 are in the fully open position. The forklift tynes can then be lowered to bring the second rail 33 into supporting engagement with the second supporting surface 42 as shown in FIG. 6f. At that position, the process can be repeated again until all of the modules 31 have been positioned in the opened position similar to that shown in FIG. 4 and thereafter the forklift can be moved away from the array 30 completely.

Closure of the PV array 30 can occur in the reverse steps to that shown in FIGS. 6a to 6f and when the modules 31 have been stacked completely in the closed position as shown in FIG. 6a, the array 30 can be lifted and transported to a storage position or to a transport vehicle.

Throughout the description and claims of the specification, the word "comprise" and variations of the word, such as "comprising" and "comprises", is not intended to exclude other additives, components, integers or steps.

It is to be understood that various alterations, modifications and/or additions may be introduced into the construction and arrangement of the parts previously described without departing from the spirit or ambit of this invention.

The invention claimed is:

1. A method of installation of a PV array whereby;
   the PV array comprises at least four planar PV modules which are of generally square or rectangular configuration so that each module defines a generally square or rectangular edge of substantially the same dimensions and comprising a pair of substantially parallel end edges and a pair of substantially parallel side edges, the modules being connected and being foldable relative to each other between a closed condition and an open condition, whereby in the closed condition, the modules are stacked together on a movable carriage on which the modules can be transported, the modules comprising a leading module, a trailing module and two or more intermediate modules, and whereby in the open condition, the modules are laterally displaced from the closed condition for collection of electromagnetic radiation, the method including transporting the modules over ground to an installation location in the closed condition on the movable carriage, once at the installation location, securing the leading module in a stationary position by placing one of the parallel end edges of the leading module on a ground surface at the installation location and once the leading module is secured, moving the carriage relative to the leading module so that the carriage moves away from the leading module and the leading module pivots about the end edge of the leading module that is placed on the ground surface, and allowing the PV array to unfold from the carriage into the open condition.

2. A method according to claim 1, the modules being stacked together in the closed condition in a generally parallel and close facing relationship with the substantially parallel end edges and the substantially parallel side edges of the modules in general alignment.

3. A method according to claim 1, the modules being stacked together in the closed condition at an angle to each other.

4. A method according to claim 1, some of the modules being stacked together in the closed condition in a generally parallel and close facing relationship with the substantially parallel end edges and the substantially parallel side edges of the modules in general alignment and others of the modules being stacked together in the closed condition at an angle to each other.

5. A method according to claim 1, the leading module and the module attached to the leading module being stacked at an angle to each other and with the remaining modules being stacked in a generally parallel and close facing relationship.

6. A method according to claim 1, the modules of the entire PV array unfolding simultaneously as the carriage moves away from the leading module.

7. A method according to claim 1, the modules unfolding two at a time, so that the leading module and the module to which the leading module is connected unfold first and thereafter subsequent pairs of modules unfold.

8. A method according to claim 1, including installing one or more abutments that engage against a surface of the leading module that faces in the direction of movement of the carriage and that allows the required relative movement of the carriage away from the leading module.

9. A method according to claim 8, the one or more abutments being pegs that are driven into the ground surface.

10. A method according to claim 1, the leading module being secured by a connection made between the leading module and a stationary anchor.

11. A method according to claim 1, the movable carriage being a transport vehicle.

12. A method according to claim 1, the movable carriage being a forklift.

13. A method according to claim 12, the method including lifting the PV array on the types of the forklift, securing the leading PV module in place on the ground surface and driving the forklift away from the leading PV module to allow the PV array to unfold.

14. A method according to claim 1, the method including laying rails on the ground surface on which the PV array is to be installed and sliding the PV modules over the rails from the closed to the open position.

15. A method according to claim 14, the rails including rollers over which the PV modules can roll.

16. A method according to claim 1, wherein the modules comprise a group of at least two modules formed as a row.

17. A method according to claim 16, the group consisting of at least three modules formed as a row.

18. A combination PV array and movable carriage for use in the method of claim 1.

19. The combination according to claim 18, the movable carriage including skids, wheels, rollers or casters.

20. The combination of claim 18, the carriage including a base and an end wall, the PV array being supported on the base and the trailing module being in engagement with the end wall in the closed condition.

21. The combination of claim 18, the movable carriage being a transport vehicle or a forklift.

22. A PV array, the PV array comprising at least four planar PV modules which are of generally square or rectangular configuration so that each module defines a generally square or rectangular edge of substantially the same dimensions and comprising a pair of substantially parallel end edges and a pair of substantially parallel side edges, the modules being connected and being foldable relative to each other between a closed condition and an open condition, whereby in the closed condition, the modules are stacked together on a movable carriage on which the modules can be transported, the modules comprising a leading module, a trailing module and two or more intermediate modules, whereby in the open condition, the modules are laterally displaced from the closed condition for collection of electromagnetic radiation with the leading module and the trailing module facing in opposite directions and the intermediate modules alternating between facing in the direction of the leading module and the trailing module, whereby a first ground surface engagement rail is connected to extend along a free end edge of the leading module and a second ground surface engagement rail is connected to extend along a free end edge of the trailing module and a third ground surface engagement rail is connected to extend along a connection between a pair of adjacent end edges of a pair of PV modules between the leading and trailing modules, the first, second and third ground surface engagement rails engaging a ground surface on which the PV array is installed in the open position.

23. A PV array according to claim 22, the rails being concrete rails.

24. A PV array according to claim 22, the rails including openings for forklift tyres.

25. A method according to claim 1, in which the PV modules are connected along adjacent end edges and are foldable relative to each other about the connected end edges between a closed condition and an open condition.

* * * * *